Jan. 10, 1928.  1,655,461

A. GRAVES

OPTICAL PROJECTION APPARATUS

Filed Feb. 18, 1925   2 Sheets-Sheet 1

INVENTOR
ARNOLD GRAVES
By

INVENTOR
ARNOLD GRAVES

Patented Jan. 10, 1928.

1,655,461

UNITED STATES PATENT OFFICE.

ARNOLD GRAVES, OF LONDON, ENGLAND.

OPTICAL PROJECTION APPARATUS.

Application filed February 18, 1925, Serial No. 10,055, and in Great Britain February 18, 1924.

This invention refers to optical projection apparatus designed for projecting an image or a message or a continuous succession of images or/and messages, or a plurality of separate images or messages on to a surface or screen, whether transparent or opaque, for indicating advertising, shop-window display or analogous purposes.

The said invention comprises the combination of a source of light to illuminate the object or image or the like (which it is desired to project), with a concave reflector, in such a manner as to reproduce upon a screen or other surface an image of the object or image which is positioned on the axial line of the reflector and illuminated in such a manner that rays of light emanate from the object or image and are reflected back past the object on to the screen or other surface where they come to a focus.

Thus, there is reproduced an enlarged, reduced or equal image of the original object or image. These objects may be transparent or opaque and in any colour or plurality of colours. A mechanical device may also be employed, whereby the object or image or series of objects or images is moved horizontally or vertically or in some other manner across the axial line, thus producing either an intermittent change of image upon the screen or an effect of movement. This movement may be either intermittent or continuous and in the former case a synchronized shutter or some other system of temporarily obscuring the source of light or the illuminated object or image may be employed. A diaphragm or light shield with an aperture may be fitted, as being a simple method of obtaining sharpness of focus and minimum distortion, but the present invention is not restricted to the employment of such a diaphragm.

In order that the said invention may be clearly understood, reference is directed to the following description and accompanying drawings, wherein:—

Figure 1:
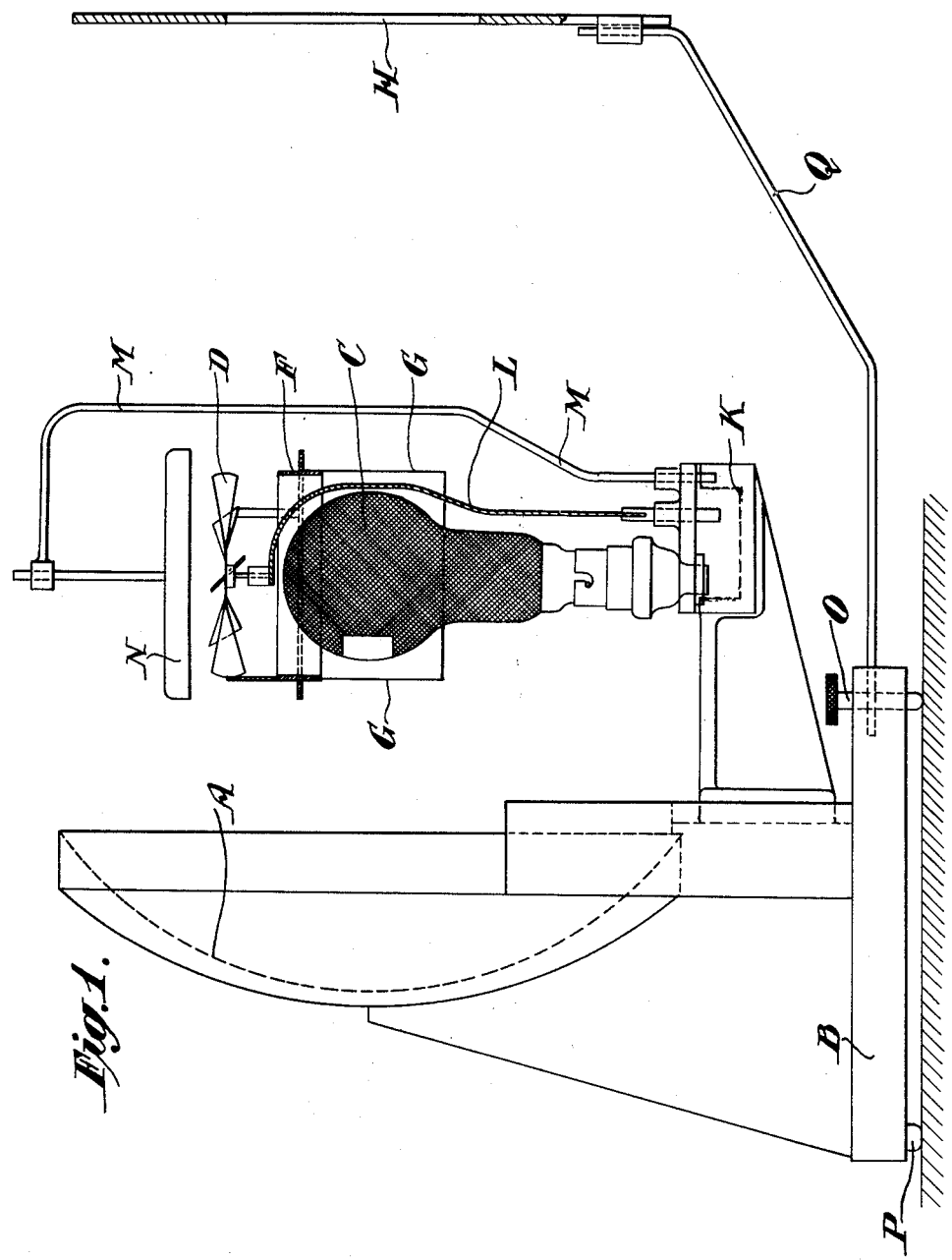
Figure 1 is an elevation of one form of the apparatus with the projecting screen (which is comparatively distant) omitted.

Referring to Figure 1, in this embodiment in which it is proposed to project a series or a continuous strip of translucent images and/or objects, messages or the like, I employ a large concave reflector A, resting on a stand B which is furnished with one fixed foot P and two adjustable feet O which permit of accurate levelling of the apparatus, a desirable but not essential feature. This reflector may be of the so-called "Mangin" type, or may have a polished reflecting surface formed by the revolution about its axis of any one of the following curves, viz:—the circle, the ellipse, the parabola, the hyperbole, or of modifications of such curves. Preferably I employ either a "Mangin" or a hyperbolic type as giving the truest image without much distortion. In front of this reflector and along the axial line thereof is mounted a cylindrical carrier F having its axis in a vertical plane. To the top of or above this cylinder is fitted or attached a horizontal propeller D, consisting of a series of inclined blades or vanes which spin freely on the needle supported by the carrier L and carry lugs which support the cylindrical carrier F, which carries the revolving skirt G of transparent material on which is printed, drawn, painted, written or attached the objects, messages or images to be projected. The propeller D tends to revolve the cylinder F about its axis when air currents pass up and impinge on the blades D. The cylindrical carrier with its object skirt G more or less encloses an electric light bulb or other source of light C, which can thus function in the dual role of source of light and source of heat for providing by convection the upward air currents which cause the cylinder to revolve.

As stated, the objects or images are mounted on the carrier in sequence in the form of the skirt G below the carrier, or the carrier may be lengthened vertically and the objects mounted across apertures or slots cut in the carrier F itself. The height of the carrier in relation to its enclosed light source is adjusted so that the mass of the light is in the same horizontal plane as the images and the construction is mounted in such a manner that the centre of the image is along the central axis of the reflector, and at a distance from this reflector that varies in accordance with the distance of the screen or surface on to which the image will be projected. Mechanical means for varying these adjustments may be fitted if desired. For instance, as shown, a bracket K is mounted in front of the reflector and provides adjustment in three directions, namely, outwards, upwards and sideways, for the fittings mounted thereon.

The objects may be of or on opaque material illuminated by the light source C reflected on to the projecting-reflector A, and thence to the screen. In this case, the light distribution may be arranged so as to fall on to the outer surface of the band G directly facing the mirror where it is required to project images of opaque subjects, etc.

An aperture or diaphragm H may be employed to diminish astigmatism and aberrations produced by the marginal rays. When used, this aperture is preferably mounted where the light rays converge between the image carrier and the screen. This diaphragm H, consisting of a flanged disc with a central circular aperture, is mounted in front of the apparatus on a support Q.

It is desirable, although not essential, to mask all rays of light from the light source other than those impinging on the object or image to be projected. This may be done by encasing the light source with a light-proof material in which a slot is cut through which the light is directed on to the object or image. In the case of an electric light bulb, this may also be done by coating the outer surface with a light-proof paint or other substance, leaving a slot exposed between the filament and the object or image in position for projection. This electric lamp may be replaced by a gas or oil burning light source to suit expediency.

Above the revolving vanes D a damper or brake N is suspended from its supporting carrier M, and the speed of the revolving mechanism can be controlled at will by adjusting the height of the brake in relation to the vanes.

The employment of the above means of obtaining movement by the conversion of radiant energy into kinetic energy is known and is not an essential feature of this invention, although it will be employed in one embodiment thereof. Other means, such as clockwork, electric motors, or solenoids, and other known means can obviously be employed. Again, the axis of the rotating carrier may be positioned in positions other than the vertical, according to the motive power employed.

It is understood that a plurality of light and/or heat sources may be employed and will come within the scope of this invention. Further, the rotating carrier need not be cylindrical but might be of any shape provided that the objects or images are consecutively presented to the reflector in the same position and alignment.

In other embodiments of this invention a variety of mechanical means and devices may be employed to bring the objects or images into position for projection, or even single objects may be presented. Or the apparatus may be combined with existing combinations of mirrors, prisms and so forth interposed between the projector and the screen or other projection surface. Or again a screen may be utilized embodying other images or devices, or a known type of translucent screen employed which has a reflecting mirror surface.

It is clear that all such devices are accessories and that apparatus embodying them into the main principles come under the scope of the invention.

Illusions and distortion effects may be obtained by altering the position of the surface upon which the images are projected or by projecting on to irregular or multiple surfaces or by imparting movement to this surface, or by applying the same principles to the objects or images to be projected, or by employing reflectors which produce effects of distortion.

Figure 2:
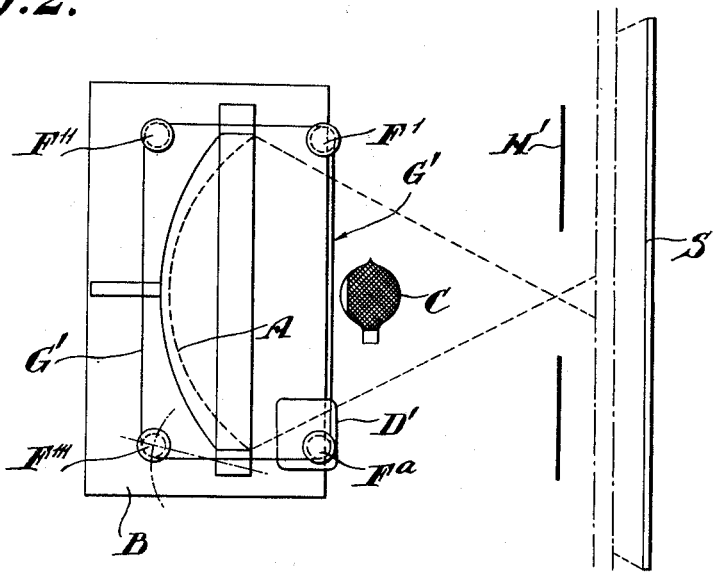
Figures 2 and 3 are diagrammatic plan and elevation respectively of an alternative form.
Figure 3:
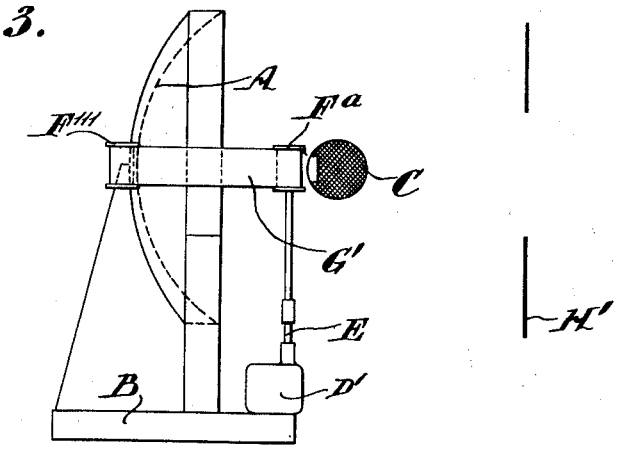

Figures 2 and 3 show an embodiment of this invention in which A is a concave reflector resting on a stand B. Four rollers $F^a$, $F^1$, $F^{11}$, $F^{111}$ respectively are mounted on suitable supports in such a manner that an endless band G', on which the messages, objects, or images are printed, drawn, painted, written or attached, passes horizontally across a point in front of the centre of the reflector and at such a distance from it that the projected rays come to a focus on the screen S. At the side of this band G' furthest from the reflector is mounted an electric light bulb C, the majority of whose surface is obscured or screened exteriorly, leaving a small aperture or window exposed to illuminate the portion of the band directly opposite the centre of the reflector. An electric motor D', by means of a reduction gear and a driving spindle E, or some other suitable mechanism, causes the driving roller $F^a$ to revolve at the required speed, thus causing the band G' with its images, etc., to pass across the focal centre of the reflector A which reproduces a similar movement of the image produced on the screen at S. An even tension is maintained on the band G' by a tension or "jockey" roller $F^{111}$, or some other similar system. It is obvious that the position or number of the rollers is variable and that these may even be replaced by other suitable mechanism. Again, the movement of the images need not necessarily be horizontal since, by turning the apparatus on its side, the movement immediately becomes vertical. A diaphragm H' may be fitted if desired, and is preferably mounted, as shown, in front of the apparatus. This diaphragm consists of a sheet of metal or wood or other suitable material, with a circular aperture whose centre is in the optical axis of the system. A rectangular screen S of "ground" glass or some other suitable translucent or opaque material receives the message or image projected.

When a diaphragm is employed, a "tunnel" effect is produced which greatly enhances the brilliancy of the image.

For mobile messages or image display on motor vehicles, trains, boats and the like, lamps and other driving gear may be fitted that will be suitable for employment with the existing electrical equipment of the vehicle in question, and the embodiment shown in this diagram is applicable to this special form of publicity, but is obviously applicable for other purposes, including projection of items from the "tape machine."

As mentioned, this apparatus, in most of its forms, may be made portable and enclosed in a case which may be circular or rectangular, or any other suitable shape, and may also include the screen on which the image is produced with or without the use of reflectors, or other optical devices for shortening the distance between the lens and the screen, or for varying their relative positions.

I claim:—

A picture projecting apparatus comprising a lamp having one side portion transparent and the opposite side impervious to the penetration of light, a concave reflector facing the transparent portion of the lamp and spaced therefrom, means for moving a translucent picture between the transparent portion of the lamp and said reflector, and a screen disposed opposite the light impervious portion of the lamp and spaced therefrom and adapted to intercept rays of light emanating from the lamp, also those penetrating the picture, and those reflected from the reflecting surface.

In testimony whereof I have affixed my signature hereto this third day of February, 1925.

ARNOLD GRAVES.